US011025024B2

(12) United States Patent
Lin

(10) Patent No.: US 11,025,024 B2
(45) Date of Patent: Jun. 1, 2021

(54) CRIMPING HAND TOOL

(71) Applicant: JETOOL CORP., New Taipei (TW)

(72) Inventor: Kai-Yen Lin, New Taipei (TW)

(73) Assignee: JETOOL CORP., New Taipei (TW)

( * ) Notice: Subject to any disclaimer, the term of this patent is extended or adjusted under 35 U.S.C. 154(b) by 292 days.

(21) Appl. No.: 16/212,709

(22) Filed: Dec. 7, 2018

(65) Prior Publication Data

US 2019/0181603 A1 Jun. 13, 2019

(30) Foreign Application Priority Data

Dec. 12, 2017 (TW) .................................. 106143609

(51) Int. Cl.
*H01R 43/042* (2006.01)
*B23D 29/02* (2006.01)

(52) U.S. Cl.
CPC ....... *H01R 43/0421* (2013.01); *B23D 29/023* (2013.01); *H01R 43/042* (2013.01)

(58) Field of Classification Search
CPC . H01R 43/042; H01R 43/0425; H01R 43/015
See application file for complete search history.

(56) References Cited

U.S. PATENT DOCUMENTS

| 4,862,580 | A | 9/1989 | Wang et al. | |
|---|---|---|---|---|
| 5,109,591 | A | 5/1992 | Hung | |
| 2011/0047790 | A1* | 3/2011 | Peng | H01R 43/042 29/751 |
| 2012/0246919 | A1* | 10/2012 | Evans | H01R 43/042 29/753 |
| 2015/0040638 | A1* | 2/2015 | Yen | B25B 27/146 72/409.14 |
| 2017/0110842 | A1* | 4/2017 | Hoppe | H01R 43/0421 |
| 2017/0338614 | A1* | 11/2017 | Sutter | H01R 43/015 |

(Continued)

FOREIGN PATENT DOCUMENTS

| CN | 201067919 | 6/2008 |
|---|---|---|
| CN | 203536710 | 4/2014 |
| CN | 204793554 | 11/2015 |

(Continued)

OTHER PUBLICATIONS

"Office Action of China Counterpart Application", dated Jan. 20, 2020, p.1-p.8.

*Primary Examiner* — Peter Dungba Vo
*Assistant Examiner* — Jose K Abraham
(74) *Attorney, Agent, or Firm* — JCIPRNET

(57) ABSTRACT

A crimping hand tool configured to crimp a cable and a housing. The crimping hand tool includes a first body having at least one guiding structure, a second body is pivoted to the first body to rotate with respect to each other to be unfolded and folded, a linking member is pivoted to the second body, and the linking member has a slot, a crimping assembly is pivoted to the linking member and is slidably coupled to the guiding structure, and a shaft is movably inserted in the first body and the slot of the linking member. After the housing and cores are placed into the first body, the second and first body are folded with respect to each other to drive the crimping assembly to move along the guiding structure through the linking member to crimp the housing and the cable together.

10 Claims, 15 Drawing Sheets

(56) References Cited

U.S. PATENT DOCUMENTS

2018/0062336 A1* 3/2018 Lin ..................... H01R 43/015

FOREIGN PATENT DOCUMENTS

| | | |
|---|---|---|
| CN | 205429388 | 8/2016 |
| CN | 206140349 | 5/2017 |
| CN | 206250544 | 6/2017 |
| CN | 208045911 | 11/2018 |
| EP | 1504848 | 2/2005 |
| TW | M475086 | 3/2014 |
| TW | M547204 | 8/2017 |
| TW | M560143 | 5/2018 |

* cited by examiner

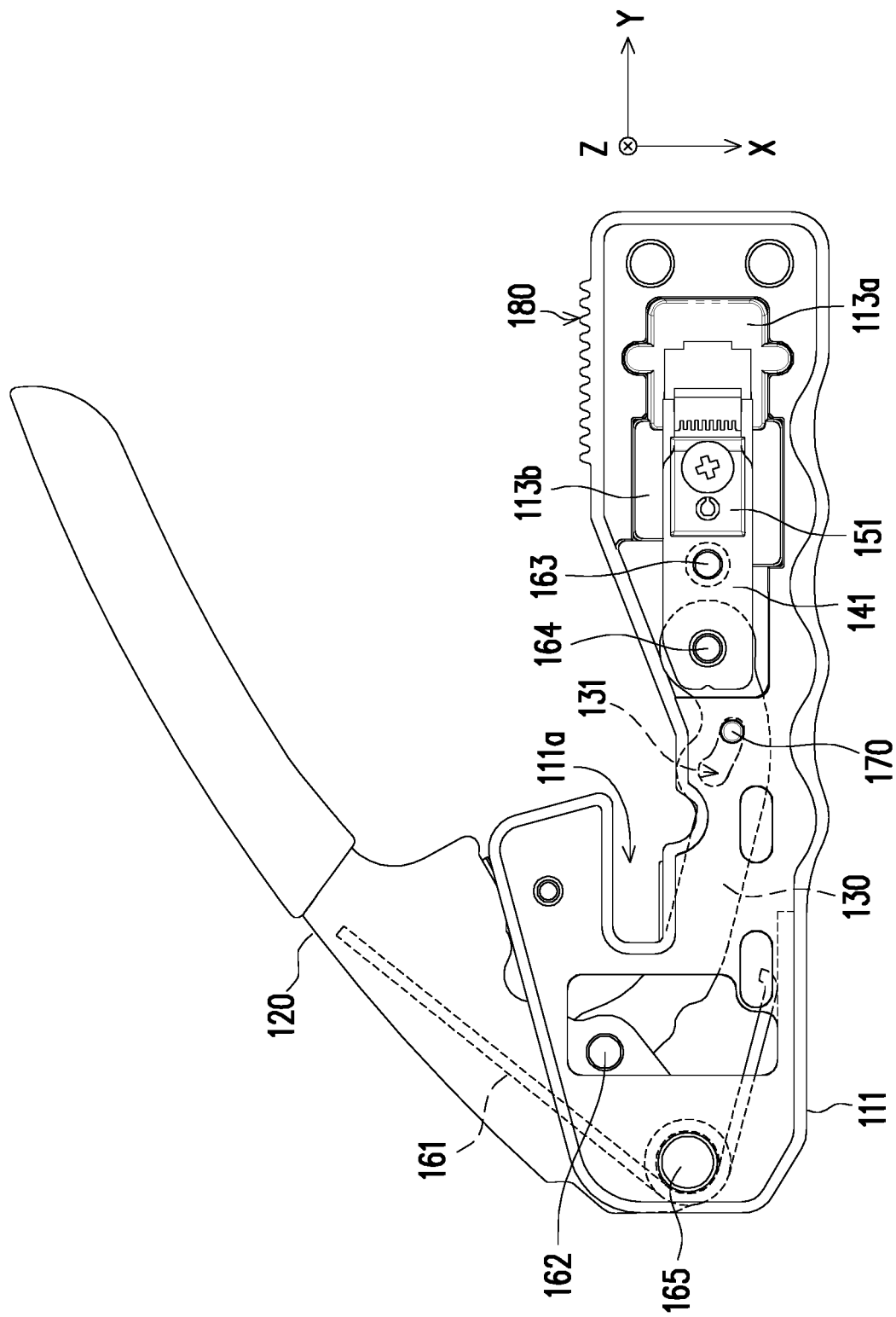

CRIMPING HAND TOOL

CROSS REFERENCE TO RELATED APPLICATION

This application claims the priority benefit of Taiwan application serial no. 106143609, filed on Dec. 12, 2017. The entirety of the above-mentioned patent application is hereby incorporated by reference herein and made a part of specification.

BACKGROUND

Technical Field

The invention relates to a crimping tool and more particularly, the invention relates to a crimping hand tool.

Description of Related Art

In the electronic products, signal transmission between and electronic apparatuses or electronic equipment is transmitted through conductive wires butted against each other in most of the time. When the conductive wires are to be butted against each other, the conductive wires are required to be fixed to a connector to be butted against another connector, so as to be electrically connected.

A variety of signal wires and signal connectors are widely applied in signal transmission, such as network lines and RJ45 connectors configured to transmit network signals, and RJ11 connectors configured to transmit telephone signals, and so on. In order to enable the variety of signal wires to be connected to corresponding connectors to form cable connectors, different type of equipment is required, and specific types of crimping tools are required for connecting and fixing the variety of signal wires.

SUMMARY

The invention provides a crimping hand tool configured to crimp a plurality of cores of a cable and a housing to form a cable connector.

A crimping hand tool provided in an embodiment of the invention is configured to crimp a cable and a housing together to form a connector. The crimping hand tool includes a first body, a second body, a linking member, a crimping assembly, and a shaft. The first body has a guiding structure. The second body is pivoted to the first body, to rotate with respect to the first body, and to be unfolded or folded. The linking member is pivoted to the second body, and the linking member has a slot. The crimping assembly is pivoted to the linking member and is movably coupled to at least a portion of the guiding structure. After the housing and the cores are placed into the first body, the second body and the first body pivot and are folded with respect to each other to drive the crimping assembly to move along the guiding structure through the linking member so that the housing and the cores are crimped together. The shaft is movably inserted in the first body and the slot of the linking member. The shaft has a coaxial body with different outer diameters to be shafted at one end of the slot.

Based on the above, in the crimping hand tool provided by the embodiments of the invention, the first body and the second body are pivoted to each other, and the linking member is disposed therebetween. In this way, when the first body and the second body rotate with respect to each other, the crimping assembly is driven to move along the guiding structure along an axis through the linking member, so that the cables and the housing are accordingly crimped together. Further, the shaft corresponds to the internal diameter and the outer diameter of the slot, and therefore, when the first body and the second body are folded with respect to each other, the user may fix the linking member through the shaft and the first body and the second body are engaged.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 4A and FIG. 4B are side views illustrating the crimping hand tool at different visual angles.

DESCRIPTION OF THE EMBODIMENTS

Figure 1A:
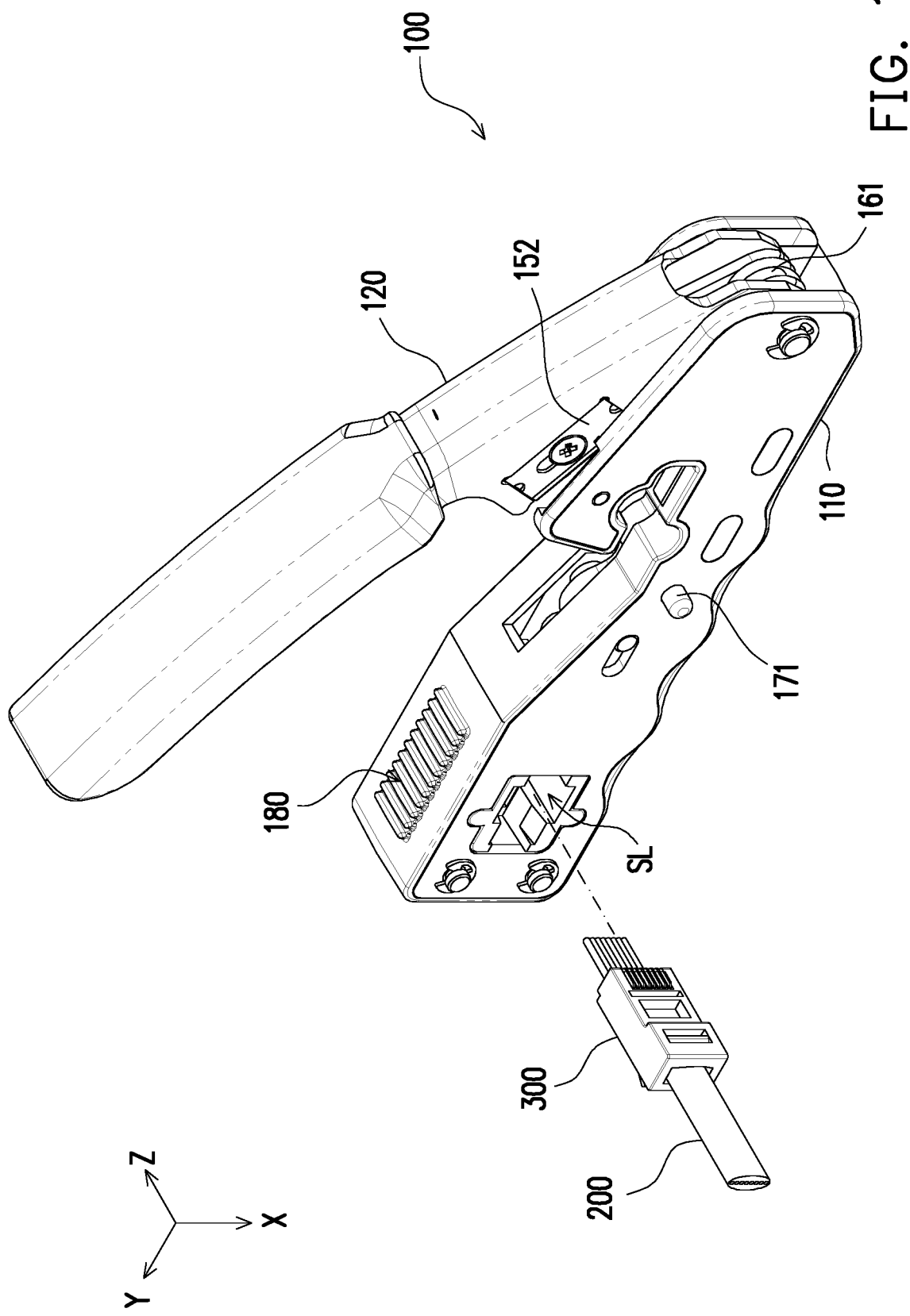
FIG. 1A is a schematic view of a crimping hand tool according to an embodiment of the invention.
Figure 1B:
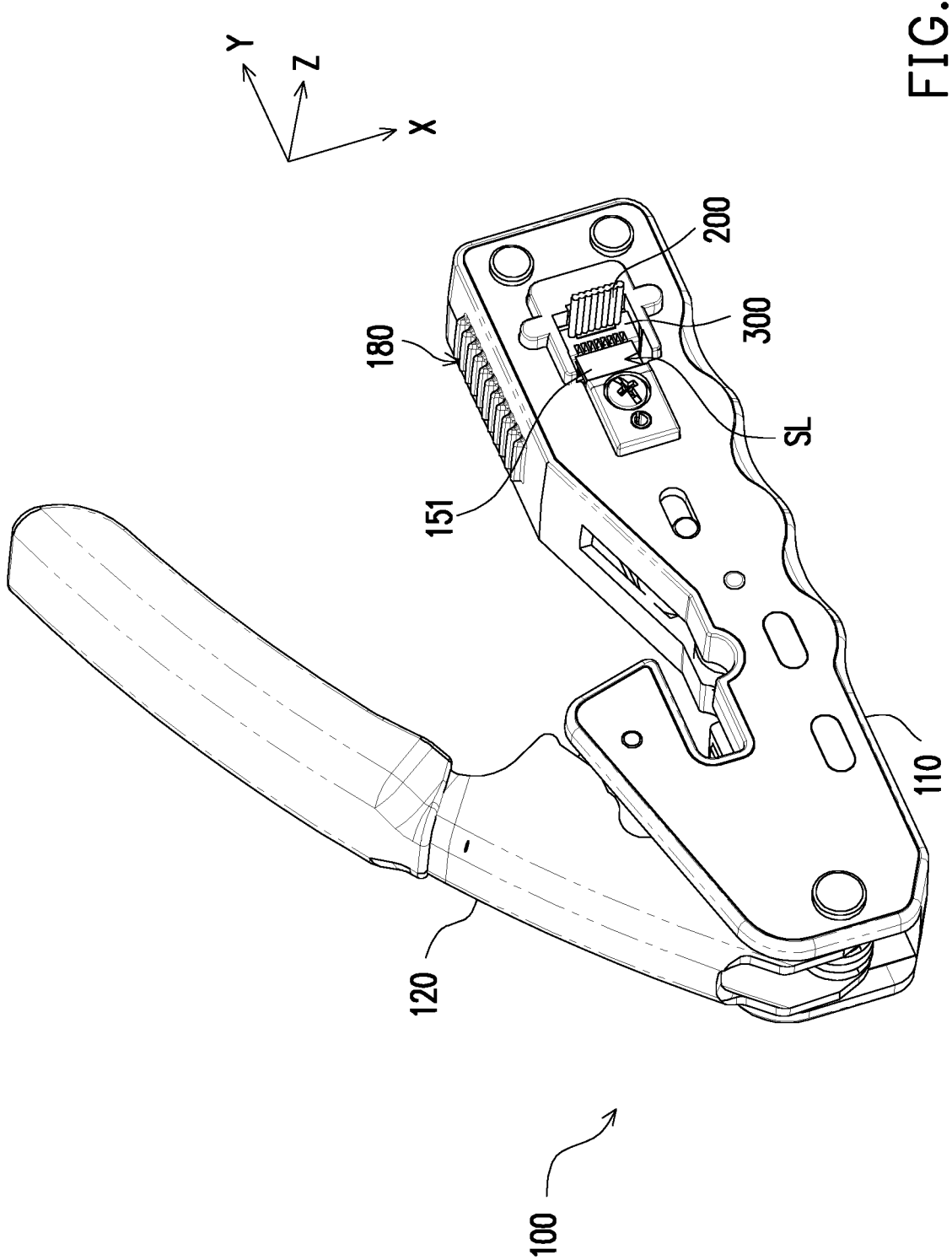
FIG. 1B illustrates the crimping hand tool of FIG. 1A at another visual angle.
Figure 2:
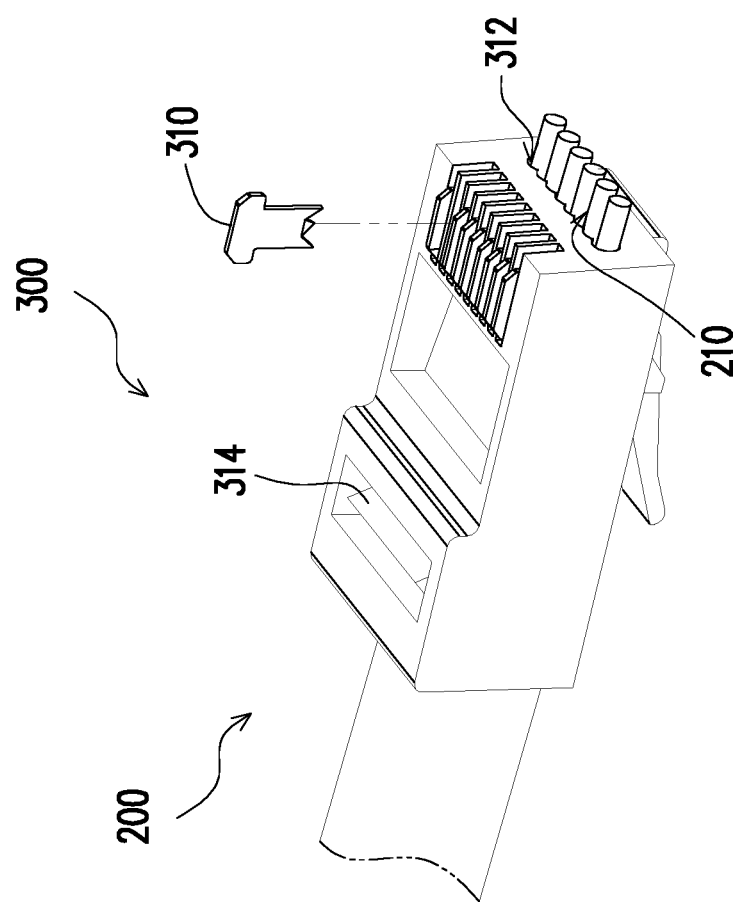
FIG. 2 schematically illustrates crimping of a cable and a housing of FIG. 1A.

FIG. 1A is a schematic view of a crimping hand tool according to an embodiment of the invention. FIG. 1B illustrates the crimping hand tool of FIG. 1A at another visual angle. FIG. 2 schematically illustrates crimping of a cable and a housing of FIG. 1A. With reference to FIG. 1A, FIG. 1B, and FIG. 2, a crimping hand tool 100 is configured to crimp a plurality of cores 210 of a cable 200 together to form a cable connector. A Cartesian coordinate system X-Y-Z is also provided herein for ease of description of a structure. FIG. 2 illustrates a state of the cable 200 and a housing 300 of FIG. 1 when being crimped. After the cores 210 penetrate the housing 300, a plurality of conductive sheets 310 are correspondingly crimped on the cores 210 through the crimping hand tool 100, so that electric conductance is generated between the cores 210 and the housing 300, and the cores 210 and the housing become the cable connector. At the same time, a crimping block 314 of the housing 300 is crimped to the cable 200 for fixing. In this embodiment, the crimping hand tool 100 includes a first body 110 and a second body 120 pivoted to each other. The first body 110 and the second body 120 may be unfolded or folded through rotation with respect to each other, and a user may use and hold the first body 110 and the second body 120 by hands. For instance, the user's thumb or a portion of the palm close to the thumb may abut the second body 120, and the rest of the four fingers may hold the first body 110. In this way, the user can easily and effortlessly operate the first body 110 and the second body 120 with only one hand for unfolding or folding, so as to perform the unfolding or folding (crimping) action after placing the housing 300 and the cable 200 together into a crimping slot SL located at the first body 110.

Figure 3A:
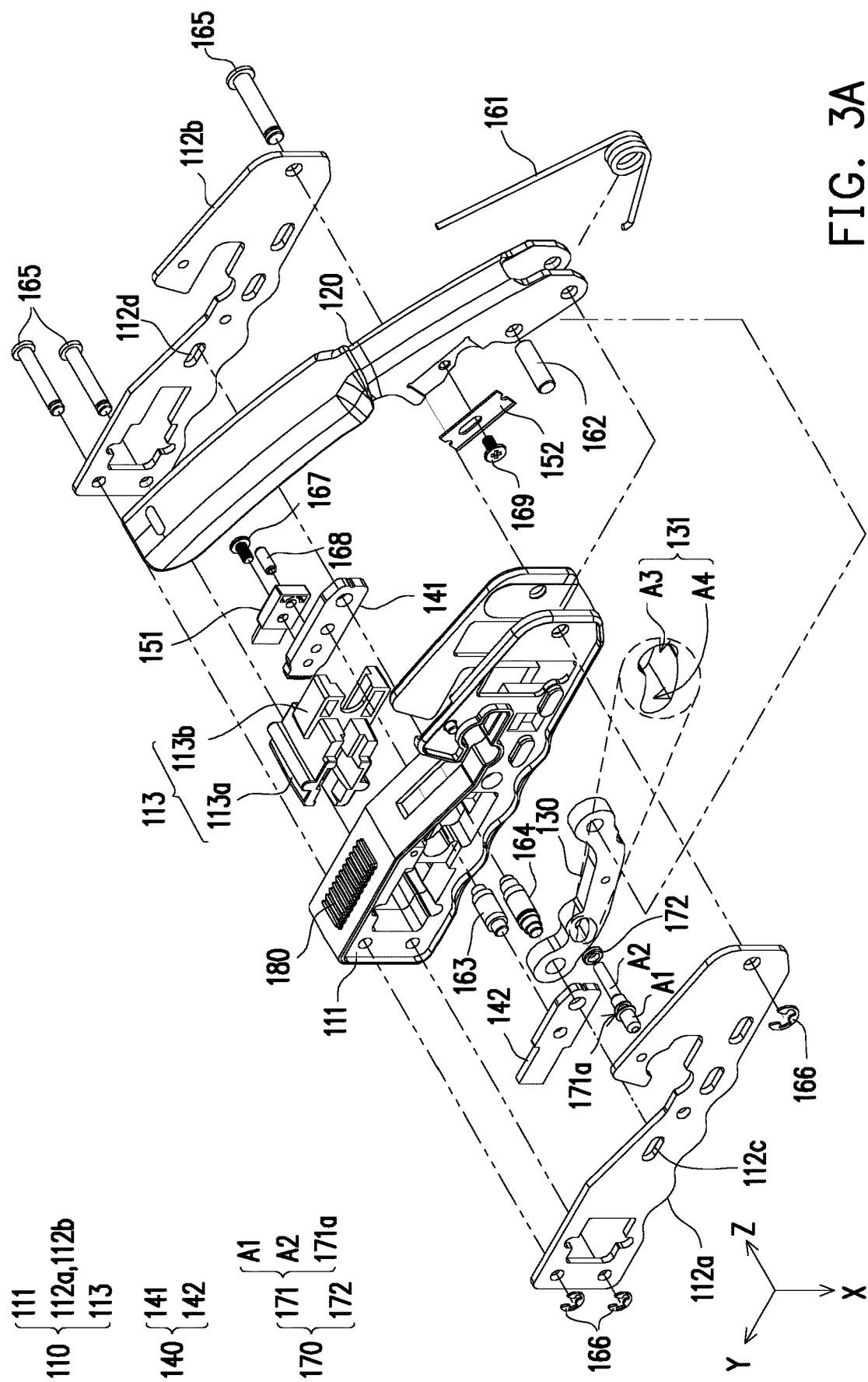
FIG. 3A is an exploded view illustrating the crimping hand tool.

FIG. 3A is an exploded view illustrating the crimping hand tool. With reference to FIG. 3A, in this embodiment, the crimping hand tool 100 includes the first body 110, the second body 120, a linking member 130, a crimping assembly 140, and a shaft 170. Herein, the first body 110 and the second body 120 are coupled to each other through a connection member 165 along the Z axis and hence are unfolded and folded with respect to each other. An elastic member 161 is also attached to provide a restoring mechanism (converting from a folded state to an unfolded state) after the first body 110 and the second body 120 are folded with respect to each other. Further, one end of the linking member 130 is pivoted to the second body 120 through a connection member 162, and the crimping assembly 140 is pivoted to the linking member 130 through a connection member 164. Moreover, the first body 110 has a guiding structure to enable the crimping assembly 140 to move and to enter and exit the crimping slot SL disposed at the first body 110 along the Y axis. In this way, the first body 110 and the guiding structure thereof and the second body 120 and the linking member 130 may together form a sliding linkage assembly, so as to drive the crimping assembly 140 to move along the Y axis through relative rotation of the first body 110 and the second body 120 along the Z axis.

Figure 3B:
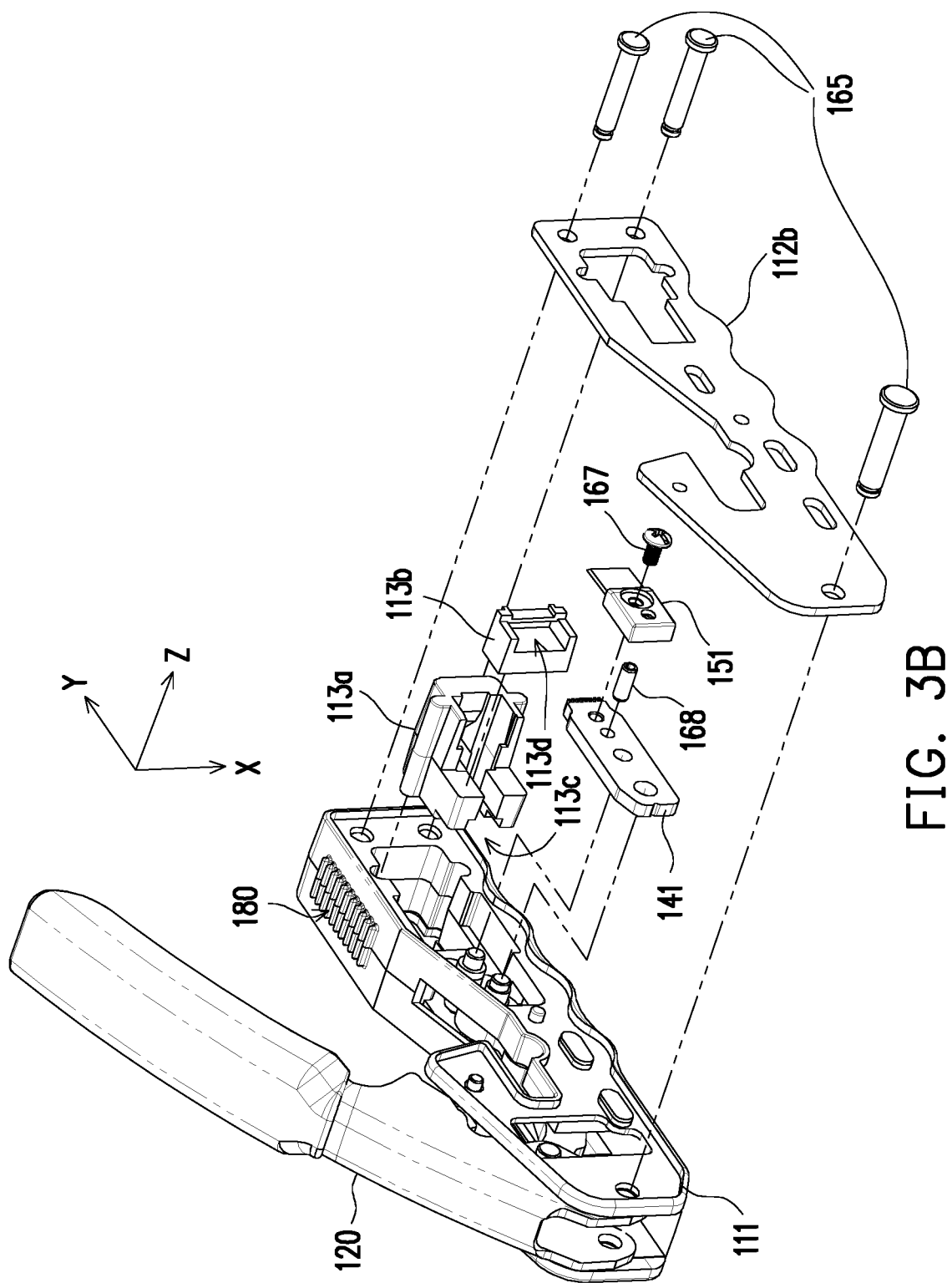
FIG. 3B is an exploded view illustrating part of members of the crimping hand tool.

FIG. 3B is an exploded view illustrating part of members of the crimping hand tool. With reference to FIG. 3A and FIG. 3B together, the first body 110 has a guiding base 113, and the guiding base 113 has the crimping slot SL to penetrate a structural body of the first body 110 along the Z axis, so that the housing 300 and the cable 200 are guided to be placed in. Further, the guiding base 113 includes a first part 113a and a second part 113b. Herein, the first part 113a has a guiding slot 113c, and the second part 113b has a guiding slot 113d. The guiding slot 113c and the guiding slot 113d are configured to guide a first crimping member 141 and a second crimping member 142 of the crimping assembly 140 to respectively move along the Y axis. In this way, the guiding base 113 (or the first body 110) may be regarded as having dual guiding structures different from each other. One of the guiding structures is configured to guide the crimping assembly 140, and the other one of the guiding structures is configured to guide the housing 300 and the cable 200. Further, guiding directions of the dual guiding structures are orthogonal to each other in this embodiment.

More specifically, the first body 110 of this embodiment is constituted by a main body 111 and a pair of side plates 112a and 112b to form a space and a guiding structure allowing the linking member 130 and the crimping assembly 140 to move in. Herein, the crimping slot SL is formed in the main body 111 through assembly of the guiding base 113 to openings on the side plates 112a and 112b. In addition, the main body 111 and a protruding structure and a sliding slot structure of the guiding base 113 or related structures of the guiding base 113 capable of supporting and maintaining movement of the linking member 130 and the crimping assembly 140, especially the related structures capable of allowing the crimping assembly 140 to move along the Y axis only such as an expansion hole 112c on the side plate 112a, an expansion hole 112d on the side plate 112b, and the connection member 164 may all be regarded as the guiding structure of the first body 110.

Figure 4A:
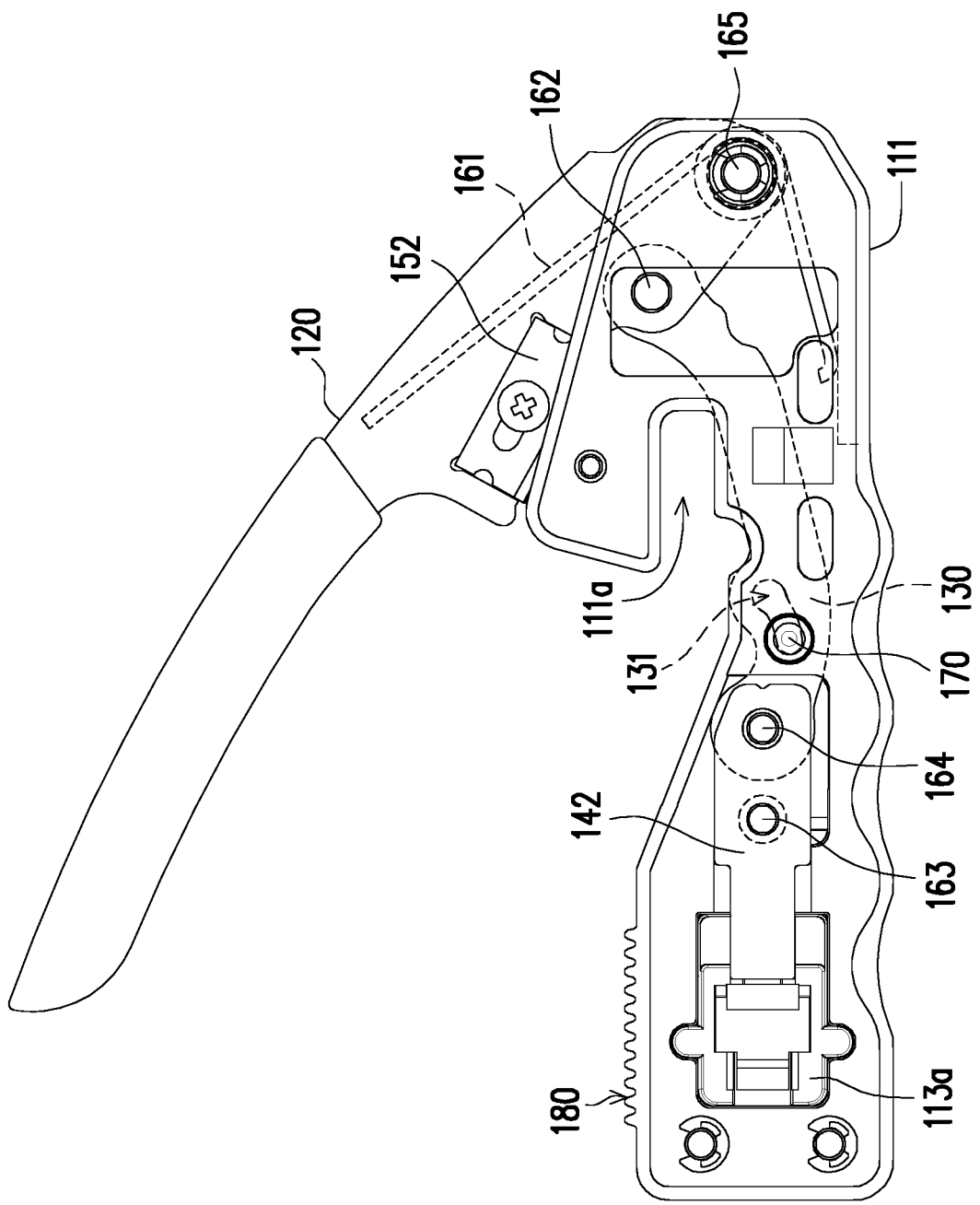
Figure 5A:
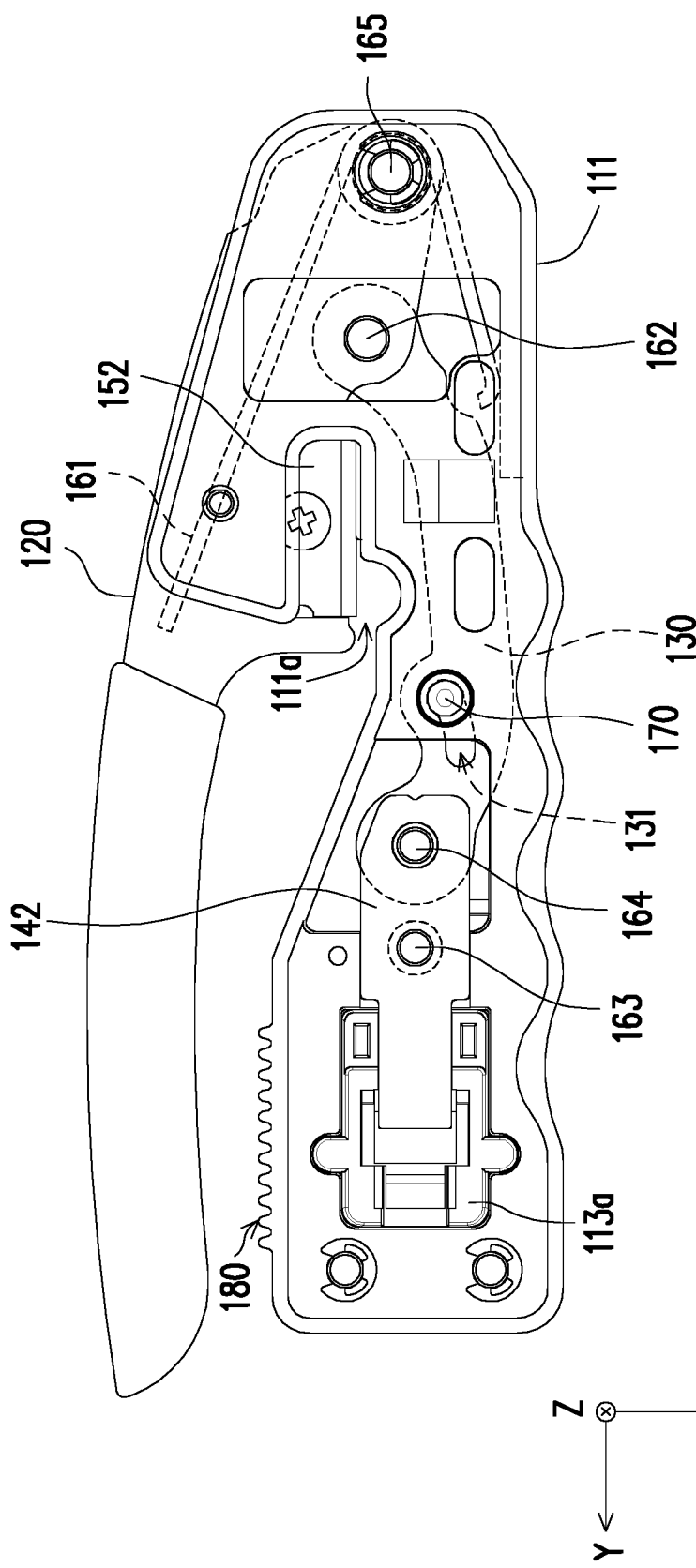
FIG. 5A and FIG. 5B are side views illustrating the crimping hand tool at different visual angles.
Figure 5B:
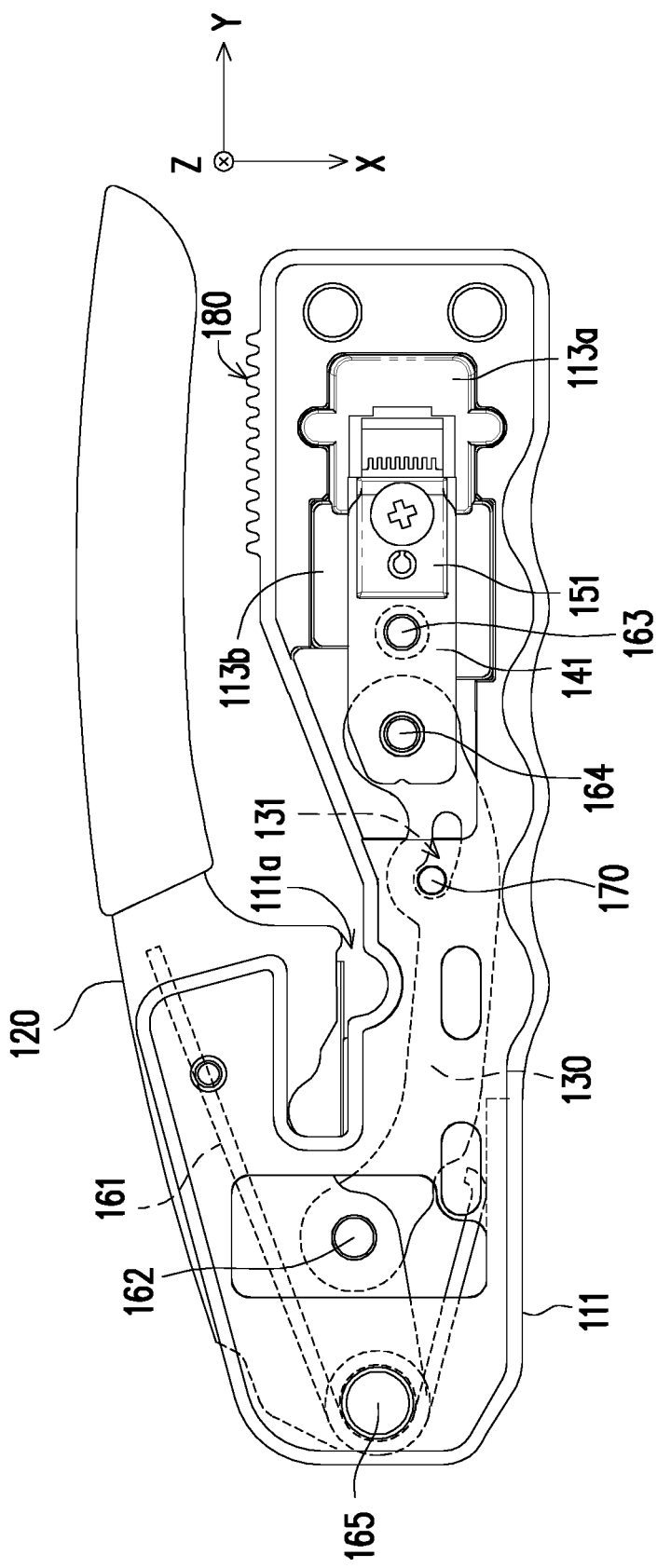

FIG. 4A and FIG. 4B are side views illustrating the crimping hand tool at different visual angles. FIG. 5A and FIG. 5B are side views illustrating the crimping hand tool at different visual angles. Herein, FIG. 4A and FIG. 4B illustrate the unfolded state of the crimping hand tool 100 in opposite side views while the side plates 112a and 112b are omitted, and FIG. 5A and FIG. 5B illustrate the folded (crimped) state of the crimping hand tool 100 in opposite side views while the side plates 112a and 112b are omitted as well. With reference to FIG. 4A to FIG. 5B and the members shown in FIG. 3 together, in this embodiment, the crimping assembly 140 includes the first crimping member 141 and the second crimping member 142. The first crimping member 141 and the second crimping member 142 are connected in parallel through the connection member 163, located at opposite sides of the guiding base 113 along the Z axis, and are pivoted to the linking member 130 through the connection member 164. At this time, the connection member 164 can still slidably coupled to the expansion hole 112c on the side plate 112a and the expansion hole 112d on the side plate 112b so that the first body 110 accordingly enables the linking member 130 and the crimping assembly 140 to slide and limits the linking member 130 and the crimping assembly 140. Hence, along with rotation of the first body 110 and the second body 120 with respect to each other to be unfolded and folded, the crimping assembly 140 is driven through the linking member 130.

Figure 6A:
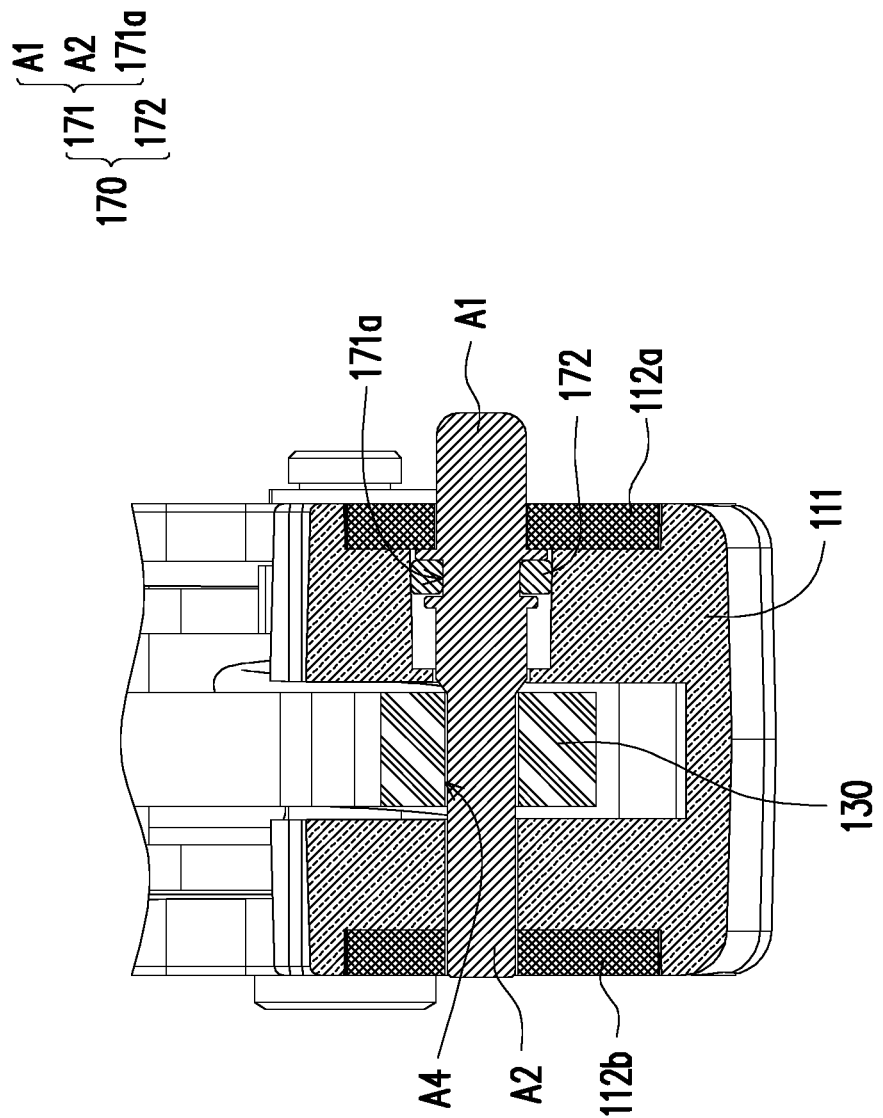
FIG. 6A to FIG. 6D are local cross-sectional views illustrating the crimping hand tool.
Figure 6B:
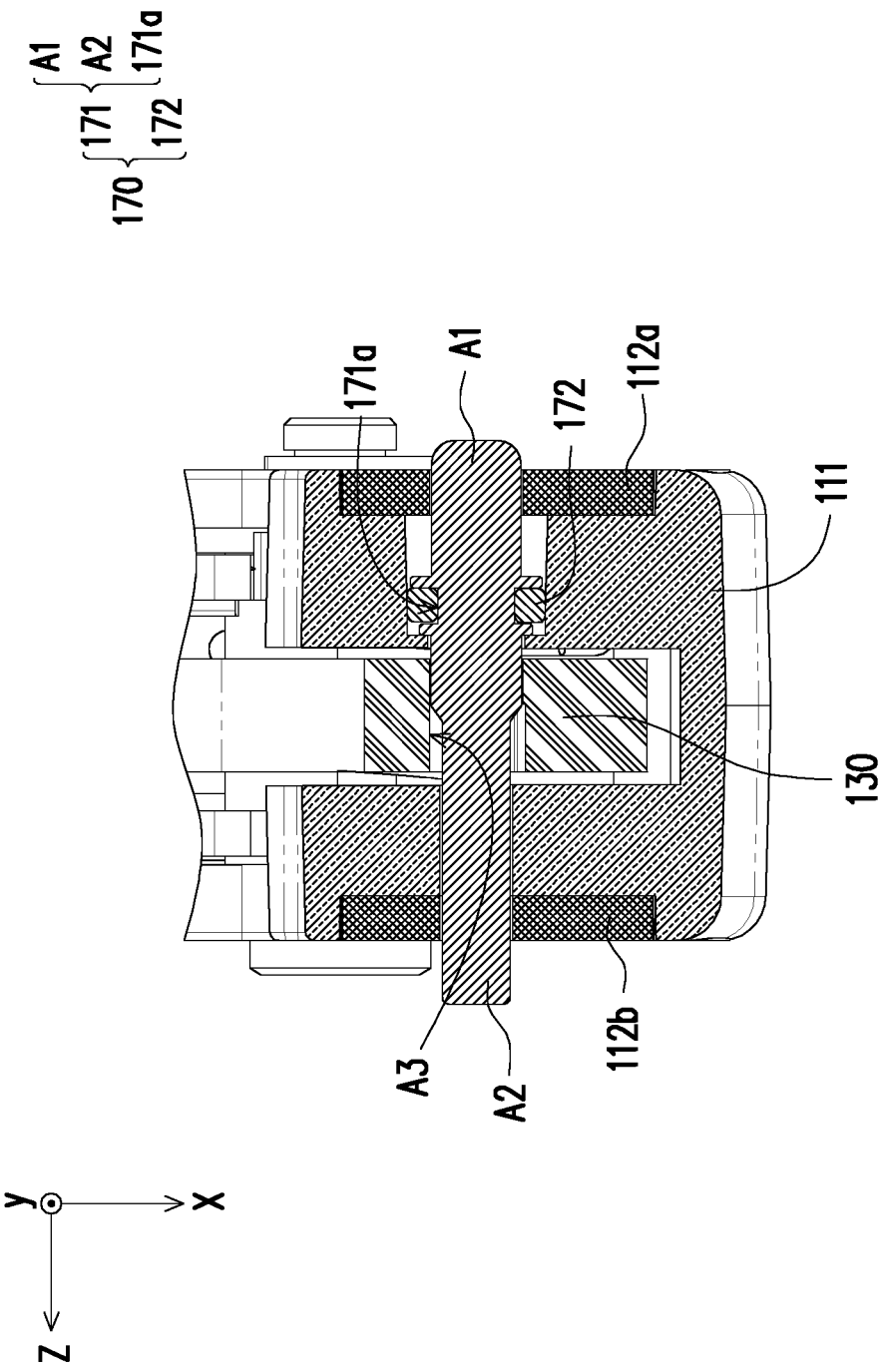

FIG. 6A to FIG. 6D are local cross-sectional views illustrating the crimping hand tool. With reference to FIG. 6A and FIG. 6B first, FIG. 6A and FIG. 6B illustrate local cross-sectional views of the shaft 170 of the crimping hand tool 100. FIG. 6A corresponds to the unfolded state such as the state shown in FIG. 4A and FIG. 4B, and FIG. 6B corresponds to the folded state such as the state shown in FIG. 5A and FIG. 5B. Further, with reference to the linking member 130 shown in FIG. 3A, it may be clearly seen that the linking member 130 of this embodiment has a slot 131, and internal diameters of a first end A3 and a second end A4 of the slot 131 are different. As shown in FIG. 3A, the internal diameter of the first end A3 is greater than the internal diameter of the second end A4. In addition, it should be noted that the slot 131 may be regarded as an expansion hole slot, and a size of the internal diameter of the first end A3 is unchanged in the lot 131 and the internal diameter is increased only at the second end A4, and changes of the internal diameters may be clearly seen in figures.

Correspondingly, the shaft 170 includes a shaft body 171 and an O-ring 172, and the shaft body 171 is a coaxial body with different outer diameters. That is, the shaft body 171 is divided into a first segment A1 and a second segment A2 of different outer diameters, and the outer diameter of the first segment A1 is greater than the outer diameter of the second segment A2. In addition, the shaft body 171 further includes a concave channel 171a. After the O-ring 172 is sleeved on the concave channel 171a, the shaft body 171 is then inserted in the main body 111 of the first body 110, and at the same time, friction generated between the O-ring 172 and the main body 111 may prevent the shaft body 171 from slipping off the first body 110. Meanwhile, the O-ring 172 may also act as a buffer between the shaft 170 and the first body 110, and that abrasion is prevented from being generated. As described above, when the first body 110 and the second body 120 are unfolded with respect to each other, the second segment A2 of the shaft body 171 corresponds to the first end A3 of the slot 131 and a major portion of the slot.

Further, since the outer diameter of the second segment A2 is less than the internal diameter of the first end A3 and an internal diameter of the slot, as shown in FIG. 6A, the linking member 130 may smoothly be driven to move in the first body 110. When the first body 110 and the second body 120 are folded with respect to each other, the linking member 130 moves so that the shaft 170 corresponds to the second end A4, and as shown in FIG. 6B, a user may drive the shaft body 171 of the shaft 170 to move along the Z axis. As such, the first segment A1 extends into the second end A4 of the slot 131 of the linking member 130, so the linking member 130 is locked and fixed by the shaft 170. In this way, the first body 110 and the second body 120 are accordingly engaged, and the folded state is thereby maintained. In other words, the moving axis (the Z axis) of the shaft 170 is substantially a normal line of a moving plane (X-Y plane) on which the linking member 130 and the slot 131 are located. When the first body 110 and the second body 120 are folded or unfolded with respect to each other, the shaft body 171 moves between the second end A4 and the first end A3, and the linking member 130 is guided by the shaft body 171 while being moved inside in the first body 110.

Figure 6C:
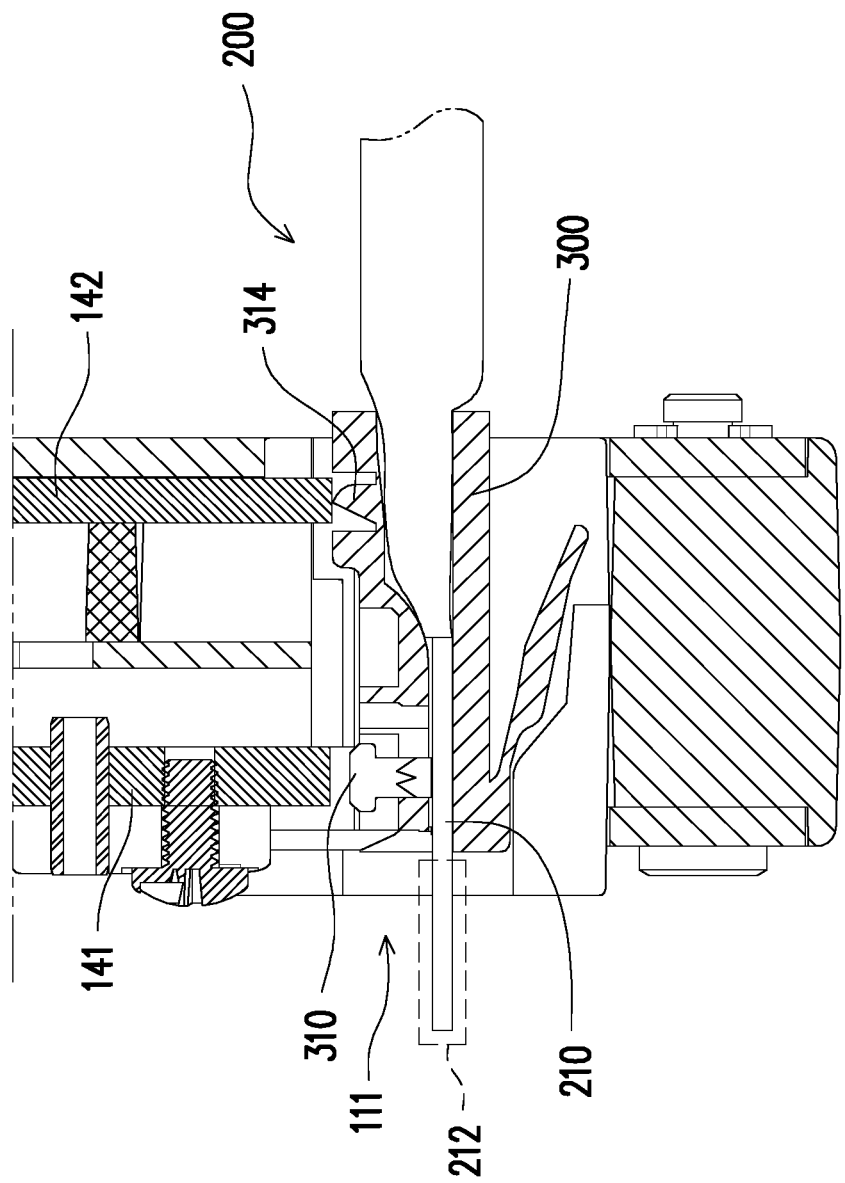
Figure 6D:
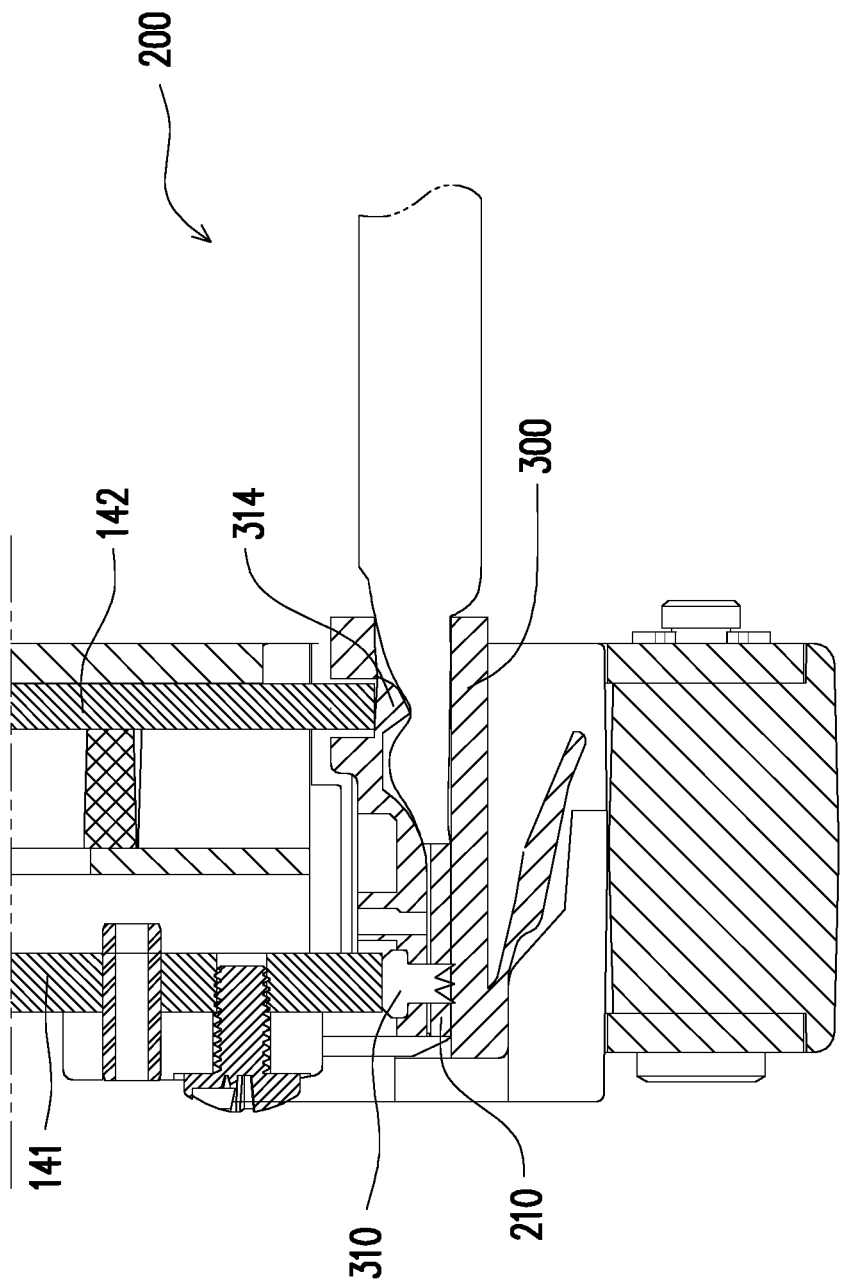

With reference to FIG. 6C and FIG. 6D, FIG. 6C and FIG. 6D schematically illustrate a crimping process. FIG. 6C may correspond to the unfolded state such as the state shown in FIG. 4A and FIG. 4B, and FIG. 6D may correspond to the folded state such as the state shown in FIG. 5A and FIG. 5B. As shown in FIG. 1A, FIG. 2, and FIG. 6C, after the cores 210 of the cable 200 penetrate a through hole 312 of the housing 300, the user may place the cores 210 and the housing 300 into the crimping slot SL together, as shown in FIG. 6C. Further, when the user applies a force on the first body 110 and the second body 120 to crimp, the crimping assembly 140 is driven to move along the Y axis. Herein, the first crimping member 141 crimps the conductive sheet 310 on the cores 210 to generate electric conductance, and the second crimping member 142 crimps the crimping block 314 on an insulation portion of the cable 200 to fix the cable 200 and the housing 300 together. At the same time, as shown in FIG. 3A and FIG. 3B, the crimping hand tool 100 further includes a first cutter 151 assembled on a first crimping block 141 so as to simultaneously move along with the first crimping block 141 along the Y axis. Hence, when crimping is performed, portions 212 of the cores 210 exceeding the housing 300 are cut off by the first cutter 151, so that portions of the cores 210 remaining in the housing 300 are level with an opening of the housing 300.

Figure 7:
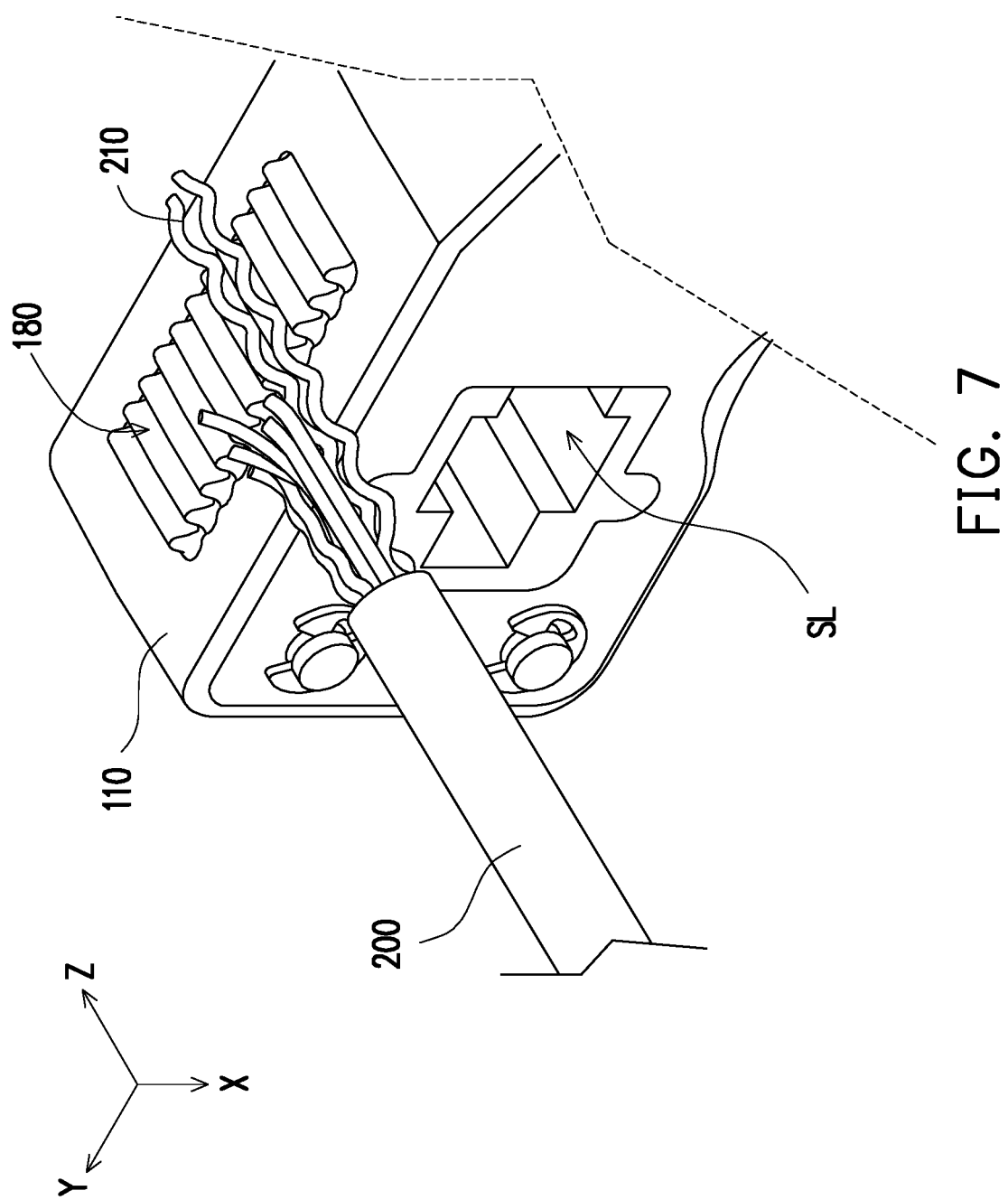
FIG. 7 is a local schematic view illustrating the crimping hand tool.
Figure 8:
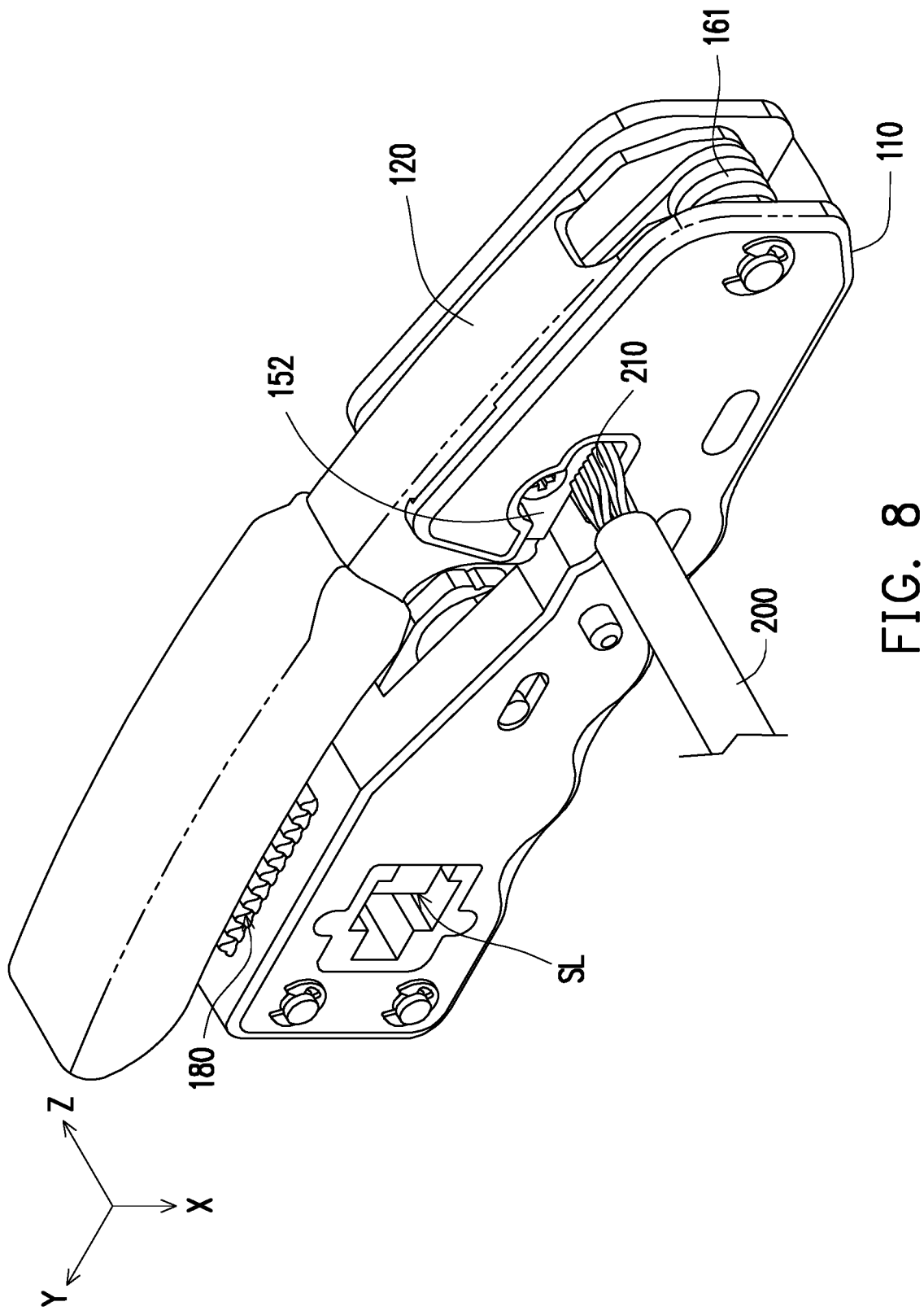
FIG. 8 is a schematic view illustrating core cutting performed by the crimping hand tool.

FIG. 7 is a local schematic view illustrating the crimping hand tool. FIG. 8 is a schematic view illustrating core cutting performed by the crimping hand tool. With reference to FIG. 3A, FIG. 7, and FIG. 8, in this embodiment, the crimping hand tool 100 further includes a core management slot 180 disposed at the first body 110 and located above the crimping slot SL. The core management slot 180 is configured to allow the user to organize and comb the cores 210 of the cable 200, especially in the folded state shown in FIG. 8 when the second body 120 is pressed on the first body 110 and abuts against the core management slot 180, so as to facilitate management of the cores 210 performed by the user.

In addition, the crimping hand tool 100 further includes a second cutter 152 disposed at the second body 120. The first body 110 further includes a core-cutting slot 111a allowing the user to cut off the cable 200 through folding the first body 110 and the second body 120 together, and that the crimping hand tool 100 may accordingly operate more conveniently. That is, through arrangement of the core management slot 180, the second cutter 152, and the core-cutting slot 111a, in the crimping process of the cable connector, the required core management and core-cutting actions may be completed together through the crimping hand tool 100, so less time is needed by the user when using the crimping hand tool 100.

In view of the foregoing, in the crimping hand tool provided by the embodiments of the invention, the first body and the second body are pivoted to each other, and the linking member is disposed therebetween. In this way, through relative pivoting of the first body and the second body and the guiding structure of one of the first body and the second body, the linking member may be pivoted and move when being driven by the first body and the second body, so as to drive the crimping assembly together to crimp the cable and the housing. The linking member and the crimping assembly are substantially disposed at one of the first body and the second body. Further, the crimping slots disposed at the first body and the second body may correspond to housings and cables of different forms. Hence, the volume of the crimping hand tool is effectively reduced, the crimping hand tool may also be more widely applied, and the user may easily hold the crimping hand tool to operate the crimping hand tool.

Further, the first cutter is disposed on the crimping assembly, and the first cutter may enter and exit the crimping slot along with the crimping assembly, so as to cut off the cores of the cables exceeding the housing. As such, the cores in the housing and the exit opening of the housing are aligned. Since cutting and crimping are simultaneously performed, crimping time is effectively saved and a more convenient using experience is thereby provided.

In addition, through the core management slot, the second cutter, and the core-cutting slot disposed at the first body and the second body, when crimping the cable connector, the user may perform core management and core cutting at the same time. The foregoing actions may all be completed through the crimping hand tool only, so that using convenience of the crimping hand tool is effectively increased. From another perspective, the crimping hand tool further includes the shaft featuring a coaxial body with different outer diameters. When the first body and the second body are folded with respect to each other, the first body and the second body are engaged through the shaft thanks to changes in the internal diameters of the slot of the linking member. In this way, the first body and the second body maintains in the folded state, and the crimping hand tool may therefore be conveniently stored.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A crimping hand tool, configured to crimp a cable and a housing together to form a connector, the crimping hand tool comprising:
  a first body, having a guiding structure;
  a second body, pivoted to the first body to rotate with respect to the first body to be unfolded or folded;
  a linking member, pivoted to the second body, the linking member having a slot;
  a crimping assembly, pivoted to the linking member, movably coupled to at least a portion of the guiding structure, wherein the second body and the first body are folded with respect to each other to drive the crimping assembly to move along the guiding structure through the linking member after the housing and cores are placed in the first body so that the housing and the cores are crimped together;

a shaft, movably inserted in the first body and the slot of the linking member, the shaft has a coaxial body with different outer diameters to be shafted at one end of the slot, wherein the slot has a first end and a second end, and a body of the shaft is inserted in the slot to be moved between the first end and the second end while the linking member being guided by the shaft body and moving inside the first body, wherein the shaft corresponds to the second end to be locked with the linking member when the first body and the second body are folded, and a core management slot, disposed at the first body and located above the crimping assembly, a plurality of cores of the cable being adapted to be organized and combed through the core management slot.

2. The crimping hand tool as claimed in claim 1, wherein the guiding structure has dual guiding portions different from each other and is away from a position where the first body and the second body are pivoted, wherein one of the dual guiding portions is configured to guide the crimping assembly, wherein the other one of the dual guiding portions is configured to guide the housing and the cable.

3. The crimping hand tool as claimed in claim 2, wherein guiding directions of the dual guiding portions are orthogonal to each other.

4. The crimping hand tool as claimed in claim 2, wherein the first body comprises:

a main body, the second body being pivoted to the main body; and a guiding base, disposed in the main body, the guiding base having the dual guiding portions.

5. The crimping hand tool as claimed in claim 1, wherein the first body comprises:

a main body, the second body being pivoted to the main body; and a guiding base, disposed in the main body, the guiding base having the guiding structure coupled to the crimping assembly.

6. The crimping hand tool as claimed in claim 4, wherein the crimping assembly comprises:

a pair of crimping members, coaxially pivoted to the linking member, slidably coupled to opposite sides of the guiding base.

7. The crimping hand tool as claimed in claim 4, wherein the first body further comprises:

a pair of side plates, assembled to opposite sides of the main body, the pair of the side plates and the guiding base forming a crimping slot, the housing and the cable being guided by the crimping slot to move into the first body.

8. The crimping hand tool as claimed in claim 1, further comprising:

a first cutter, assembled to the crimping assembly, moving along with the crimping assembly, when the crimping assembly crimps the cable and the housing together, the first cutter is configured to cut a plurality of cores of the cable protruding from the housing to be aligned.

9. The crimping hand tool as claimed in claim 1, further comprising:

a second cutter, assembled to the second body to move along with the second body, the first body having a core-cutting slot, when the second body is folded towards the first body, the second cutter moves in the core-cutting slot along with movement of the second body.

10. The crimping hand tool as claimed in claim 1, wherein the slot having an expansion hole structure and a plurality of end portions of different internal diameters, when the first body and the second body are folded with respect to each other, the shaft having the coaxial body with different outer diameters to engage with corresponding one of the end portions to fix the linking member.

* * * * *